United States Patent
Bleckmann et al.

(10) Patent No.: US 7,724,144 B2
(45) Date of Patent: May 25, 2010

(54) LABEL HAVING A CAVITY FOR RECEIVING A RFID DEVICE AND AN APPARATUS AND METHOD OF MAKING AND ASSEMBLING THE SAME

(75) Inventors: Frederick August Bleckmann, Pittsfield, NH (US); Bruce Arey, Pittsfield, NH (US)

(73) Assignee: Pittsfield Weaving Co., Inc., Pittsfield, NH (US)

( * ) Notice: Subject to any disclaimer, the term of this patent is extended or adjusted under 35 U.S.C. 154(b) by 917 days.

(21) Appl. No.: 11/319,777

(22) Filed: Dec. 29, 2005

(65) Prior Publication Data

US 2006/0181423 A1 Aug. 17, 2006

Related U.S. Application Data

(60) Provisional application No. 60/640,610, filed on Dec. 30, 2004.

(51) Int. Cl.
*G08B 13/14* (2006.01)
(52) U.S. Cl. .................. 340/572.8; 340/572.1; 156/238
(58) Field of Classification Search .............. 340/572.1, 340/572.8, 573.1, 573.4; 156/731, 200, 204, 156/226, 238; 283/75, 109
See application file for complete search history.

(56) References Cited

U.S. PATENT DOCUMENTS

| | | | |
|---|---|---|---|
| 4,752,351 A | 6/1988 | Lunt | |
| 4,847,934 A | 7/1989 | Weber | |
| 5,377,814 A | 1/1995 | Smith et al. | |
| 5,583,489 A | 12/1996 | Loemker et al. | |
| 5,863,383 A | 1/1999 | Bussey | |
| 5,962,834 A | 10/1999 | Markman | |
| 6,036,099 A * | 3/2000 | Leighton | ................ 235/488 |
| 6,104,311 A | 8/2000 | Lastinger | |
| 6,354,493 B1 | 3/2002 | Mon | |
| 6,637,490 B1 | 10/2003 | Azulay | |
| 6,809,646 B1 * | 10/2004 | Lee | .................... 340/572.1 |

(Continued)

FOREIGN PATENT DOCUMENTS

DE     2624055 A     2/1978

(Continued)

*Primary Examiner*—Anh V La
(74) *Attorney, Agent, or Firm*—David Resnick; Corinne Gorski; Nixon Peabody, LLP (57) ABSTRACT

The present invention includes an apparatus for inserting a radio frequency device into a label. A ribbon of labels has a plurality of labels and a cavity formed in each of the labels. A mechanism linearly advances the ribbon of labels. A device inserts at least one radio frequency device into the cavity of a respective label. An upper layer of the ribbon of labels is slit along the channel to form an opening along a top of each of the cavities and at least one RFID device, such as a tag or coin is inserted within at least one of the plurality of cavities. A label for removably holding the RFID device includes an upper and lower layer of material. The cavity is formed between the upper and lower layers. An area of interference is located at a top of the cavity for holding the RFID device within the cavity.

21 Claims, 5 Drawing Sheets

U.S. PATENT DOCUMENTS

| | | |
|---|---|---|
| 6,827,817 B2 | 12/2004 | Bleckmann et al. |
| 6,836,215 B1 * | 12/2004 | Laurash et al. ........... 340/572.1 |
| 7,071,826 B2 * | 7/2006 | Peterson .................. 340/572.8 |
| 7,247,214 B2 * | 7/2007 | Chamandy et al. .......... 156/249 |
| 2001/0050616 A1 | 12/2001 | Lowe |

FOREIGN PATENT DOCUMENTS

| | | |
|---|---|---|
| NL | 1014737 C6 | 9/2001 |
| WO | WO 00 50239 | 8/2000 |

* cited by examiner

LABEL HAVING A CAVITY FOR RECEIVING A RFID DEVICE AND AN APPARATUS AND METHOD OF MAKING AND ASSEMBLING THE SAME

RELATED APPLICATIONS

This application claims priority of U.S. Provisional Application Ser. No. 60/640,610 filed Dec. 30, 2004. This application is also related to co-pending U.S. patent application Ser. No. 10/329,778 entitled "Method for Identifying Apparel Items and Other Goods" and Ser. No. 10/143,842 entitled "Method and Apparatus for Production of RF Labels."

BACKGROUND OF THE INVENTION

1. Field of the Invention

The present invention relates to a label having a cavity for receiving a circular or coin sized RFID device, and more particularly, to an apparatus and method of inserting the RFID device into the label cavity in a free floating fashion.

2. Description of the Related Art

The attachment of labels to cloth goods such as clothing, linens and towels is a common practice used to set forth information such as trademarks and trade names, material identification and characteristics, sizes, care instructions, and so forth. In addition, legal requirements necessitate the use of labels in clothing or on linens. A method and apparatus for producing individual folded labels from a ribbon of labels is presented in published PCT application WO 00/50239 and is incorporated in its entirety herein.

U.S. Pat. No. 6,827,817, incorporated in its entirety herein, discloses a folded label having radio frequency identification device (RFID) disposed therein. RFID tags typically consist of an antenna or a coil, to collect RF energy, and an integrated circuit (IC) which contains identification code or other information in its on-chip memory. The RFID device stores and transmits identifying information, such as inventory control, pricing control and the tracking of the origin of the merchandise.

Commercially available RFID tags generally operate at low frequencies, typically below 1 MHz. Many 13.56 and 915 MHz tags are currently commercially available in the market today. 915 Mhz tags are commercially available due to the current mandates by large retailers and the DOD requiring 915 Mhz tags on case goods for their larger suppliers. Although lower frequency devices are more common, a wide range of high frequencies are available, for example, 13.56 MHz, 915 MHz, 2.45 GHz and 5.6 GHz. Low frequency tags usually employ a multi-turn coil resulting in a tag having a thickness much greater than a standard sheet of paper. 2.45 GHz and 5.6 GHz can be done in a single turn or as a die pole antenna. High frequency passive RFID tags, which operate at around 2.54 GHz, typically consist of a single turn, flat antenna, printed onto a flat single layer sheet of plastic or paper.

The numerous different sized RFID tags can also take different shapes. The coin shaped tags can be a RFID tag encased in durable packaging. This packaging provides the tag with protection from a hostile environment that may other wise damage or destroy the tag. Environments such as heat, steam, chemicals, water and other acute demands. Due to the longevity this packaging provides such an RFID tag has the capability to survive many product life cycles.

A RFID tag embedded in a woven label is easily sewn onto a garment. This garment may be used at a garment rental facility or commercial laundry facility. After 40-50 wash cycles the garments quality and integrity is somewhat damaged from the environment it has been exposed to, however, the RFID tag embedded in the woven label is not effected. By embedding the RFID tag into the woven label, with out any permanent means such as adhesives or other attachment method that will combine the RFID tag and the woven carrier, the RFID tag can be removed without any damage or residue that could effect reprocessing of that RFID tag into another label. Thus, an RFID tag that is attachable without the use of adhesive, easily removed and reused by attaching it to another item or garment is also desirable.

As fully disclosed in U.S. patent application Ser. No. 10/143,842, commonly owned by the assignee of the present invention and incorporated in its entirety herein, a ribbon of labels with RF devices encapsulated therein can be subdivided into individual RF labels using ultrasonic means resulting in individual folded RF labels that are both soft to the touch, i.e., having edges that are generally scratchless to the apparel consumer, and capable of storing and transmitting identifying information and at the same time virtually free of defects.

It would be desirable to be able to produce labels incorporated with RF devices for storing and transmitting identifying information and that are more comfortable to the apparel customer than current labels. In addition, it is desirable to produce such labels at a higher speed and at a greater efficiency of production for both label and end product manufacturers, and with fewer defects than current methods.

Apparel items and other goods have certain identifying specifications that can be broken down into different factors and these factors contain certain options. Therefore, for example, apparel items are sorted at distribution centers by several factors, i.e., style, color, size, authenticity, date of manufacture, shipping instructions, contractor, etc. These factors can contain several options. A defining factor such as product color would contain several options, such as red, blue, and/or green. A defining factor such as size would contain several options, such as small, medium, large.

It would be useful at the point of sale or before to know and identify the date of manufacture, authenticity or season code of a given item. It also would be desirable to be able to account for the necessary identifying factors in a simplified, inexpensive manner to provide a record on the item as to its specification.

Another inconvenience the prior art labels having RFID devices is that the devices cannot be removed without destroying the label. RFID devices can be used to designate an individual's information, for example, in assigned uniforms. Thus, when a wearer returns his or her uniforms to an employer for cleaning, the RFID device can be used to identify the number of uniforms, etc., returned to an individual employee. The prior art RFID labels do not provide means to remove and reuse the RFID device.

Thus, there is a need to provide a comfortable label having a RFID device that can be removable and reused.

SUMMARY OF THE INVENTION

One aspect of the present invention is to provide steps for producing a ribbon of labels with removal RFID devices encapsulated therein, and dividing the ribbon into labels that are both soft to the touch, i.e., having edges that are generally scratchless to the apparel consumer, and capable of storing and transmitting identifying information and at the same time virtually free of defects.

Another aspect of the present invention is to provide a ribbon of labels woven with a plurality of cavities into which multiples RFID tags can be inserted prior to separating the individual labels.

Yet another aspect of the present invention is to provide a method and label that holds a RFID tag in place within a cavity thereof and allows for removal of the device without destroying the label.

Still another aspect of the present invention is to provide a method and label that allows for the recycling of RFID tags, whereby the RFID tag has a longer suitable life than the garment in which it is placed.

The present invention allows a formidable recycling method to be introduced wherein the protected RFID tag can be used many times for many garment life cycles. This feature is not only more environmentally friendly, it is also more cost effective allowing the cost of the RFID tags to be amortized over a longer period of time.

Another object of the present invention is to provide a RFID device that can be incorporated into labels whereby inventory control, pricing control and the tracking of the origin of the merchandise, for example, can be done via the RFID devices in the labels.

In accomplishing these and other aspects of the present invention there is provided an apparatus for inserting a radio frequency device into a label. The apparatus includes a ribbon of labels having a plurality of labels and a cavity formed in each of the labels, each of the cavities having an interference point located therein. A mechanism linearly advances the ribbon of labels. A device inserts at least one radio frequency device into the cavity of a respective label past the interference point to removably secure the device within the cavity.

In accomplishing these and other aspects of the present invention there is provided a method for forming a plurality of labels incorporating a radio frequency device comprising the steps of providing a ribbon of labels. The ribbon of labels includes a plurality of labels having a cavity disposed on both sides of a channel. An upper layer of the ribbon of labels is slit along the channel to form an opening along a top of each of the cavities and at least one radio frequency device is inserted within at least one of the plurality of cavities.

In accomplishing these and other aspects of the present invention there is provided a label for removably holding a radio frequency device, the label includes an upper and lower layer of material. A cavity is formed between the upper and lower layers. An area of interference is located at a top of the cavity for holding the radio frequency device within the cavity.

These and other objects, features, aspects, and advantages of the present invention will become more apparent from the following detailed description of the preferred embodiment relative to the accompanied drawings, in which:

DETAILED DESCRIPTION OF PREFERRED EMBODIMENTS

Figure 1:
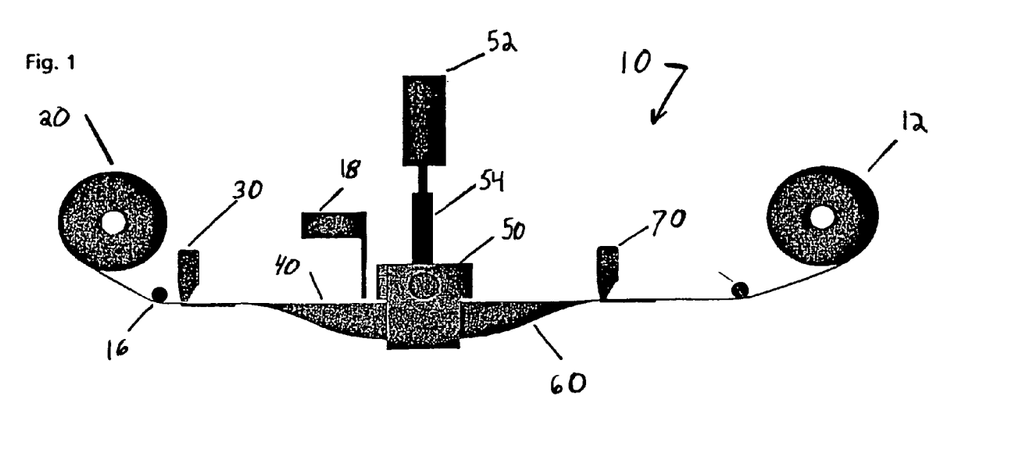
FIG. 1 is a perspective view of an apparatus of the present invention for inserting an RFID device into cavities formed in a ribbon of labels.
Figure 3A:
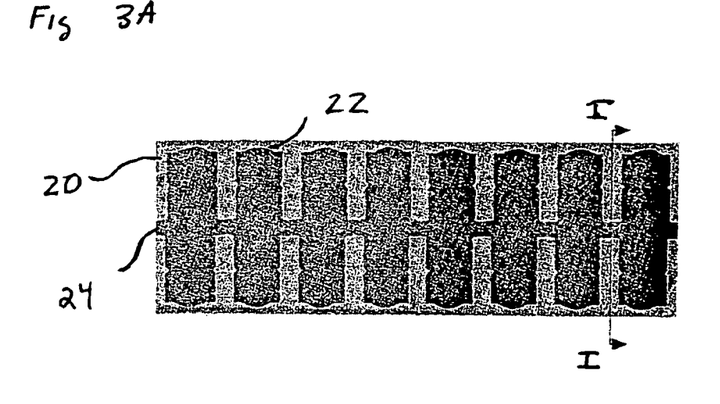
FIG. 3A is a top view of ribbon of labels woven with a plurality of cavities according to the present invention.
Figure 3B:
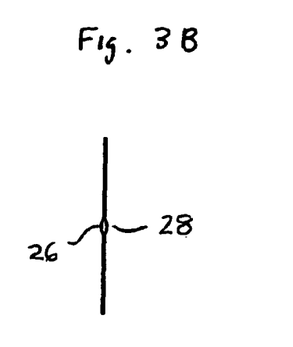
FIG. 3B is a cross-sectional view of the ribbon of labels of FIG. 3A taken along line I-I.

Referring to FIG. 1, an apparatus 10 for inserting a plurality of RFID devices into a woven label is shown. A roll of labels 20 having a plurality of cavities is mounted on a tension roller. As shown in FIGS. 3A and 3B, ribbon of labels 20 is woven with a plurality of deep cavities 22 connected by a channel 24 through its center. Folded ribbon of labels 20 can be composed of virtually any material that can be cut and pressed including a thermoplastic material (e.g., polyester), acetate, cotton, nylon, linen, paper, rayon and combinations thereof, in woven and non-woven form. Polyester is preferred. The labels can be printed or woven, however, woven is preferred. A woven label is one of a fabric having a weft and warp. Moreover, the label can be woven with a logo or other information, or the logo and/or information can be printed on the label. As can be seen more clearly in FIGS. 3B and 4B, roll of labels 20 has an upper and lower fabric layer 26, 28.

Figure 2:
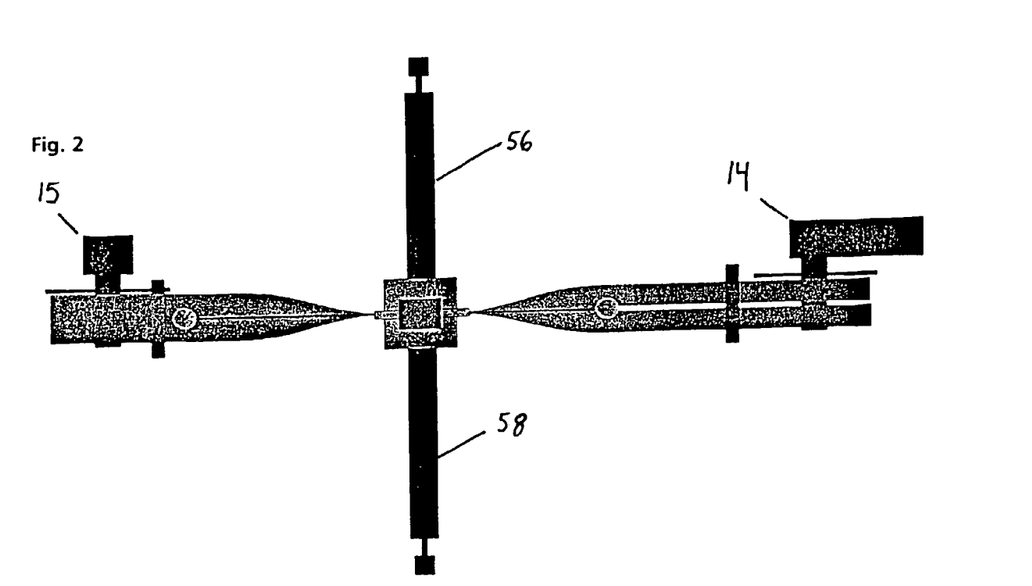
FIG. 2 is a top view of the apparatus of FIG. 1.

Referring to FIGS. 1 and 2, the roll of labels 20 is pulled from the tension roller by a linear advance mechanism such as a rewind unit 12 and a motor 14. The linear advance mechanism of the present invention operates in an uninterrupted linear advance with the ribbon of labels moving in an uninterrupted manner with the RFID tags or devices being inserted while the ribbon is in motion. The linear advance mechanism can also be a conveyor disposed between the RFID insertion point, insertion block 50, and rewind roller 12. It should be appreciated that other linear advance mechanisms are contemplated by the present invention and such mechanisms can be stopped during the process if desired.

Figures 4A, 4B:
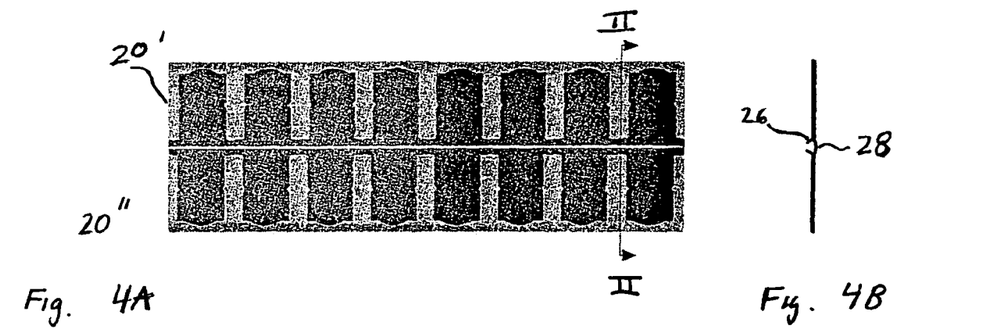
FIG. 4A is a top view of the ribbon of labels having a slit upper layer.
FIG. 4B is a cross-sectional view of the ribbon of labels of FIG. 4A taken along line II-II.

Roll of labels 20 is guided by a roller 16 through a first slitting station 30. Slitting station 30 slits the upper layer 26 of the ribbon along center channel 24, as shown in FIGS. 4A and 4B. By slitting upper layer 26 cavities 22 are exposed along two ribbon lengths 20' and 20". By having lower layer 28 of the ribbon of labels intact the ribbon of labels can continue to be pulled by the roller of rewind unit 12 and motor 14.

From slitting station 30 the roll of labels travels to a folding station 40. In folding station 40, the ribbon is folded into an upside down "U" shape with the slit in upper layer 26 facing upwards. In folding station 40 the ribbon 20 is folded or draped around a bar that acts as a support bar with the slit along channel 24 facing upwards. The cavities 22 of each ribbon length 20' and 20" are exposed allowing for two tags to be inserted into multiple cavities on either side of the support bar. This dual insertion allows for equal pressure to be applied to each cavity of the ribbons 20' and 20".

Moving forward from folding station 40, a photocell or eye 18 reads a registration mark located on the ribbon of labels 20 to activate a piston 52 to activate a pusher unit 54 of a tag aligning and insertion block unit 50, which will be described in further detail herein. To maintain the proper alignment for materials with logos and written instructions such as woven or printed labels, a fiber optic eye can be used, which reads color contrast as material advances past its read point. When a registration point passes under the eye or when the eye sees a color change an immediate interrupt signal is sent to the controller. Thus, the eye triggers the insertion advance of piston 52. A tension clutch 15 presents the ribbon for insertion by supplying force along the ribbon length to prevent collapse of the cavity and ribbon during insertion.

Figure 8A:
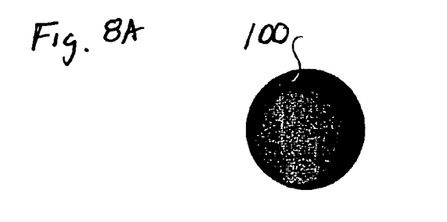
FIG. 8A is a front view of an RFID tag of the present invention.
Figure 8B:
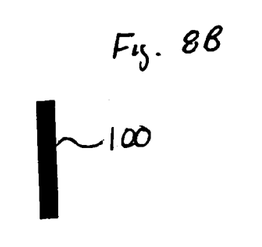
FIG. 8B is a side view of the tag of FIG. 8A.

The present invention is particularly suited for insertion of devices such as security and inventory control devices, e.g., radio frequency inventory devices (RFID) tags, into labels. A RFID device 100 according to the present invention is shown in FIGS. 8A and 8B. Device 100 can be a radio frequency inventory/antitheft control device, or other equivalent device. Although device 100 is referred to as a RFID tag or coin, it can be a silicon wafer, plastic, glass, card or other known material. Moreover, RFID tag can take numerous different shapes depending on the shape of the label and/or cavity.

Referring again to FIGS. 1 and 2, the folded length of labels is advanced to tag aligning/insertion block 50. Block 50 includes a pair of magazines 56, 58. The magazines are oppositely disposed on either side of the path of the labels. Magazines 56, 58 advance RFID tags disposed therein into position in insertion block 50 after piston 52 retracts pusher unit 54.

Figure 9A:
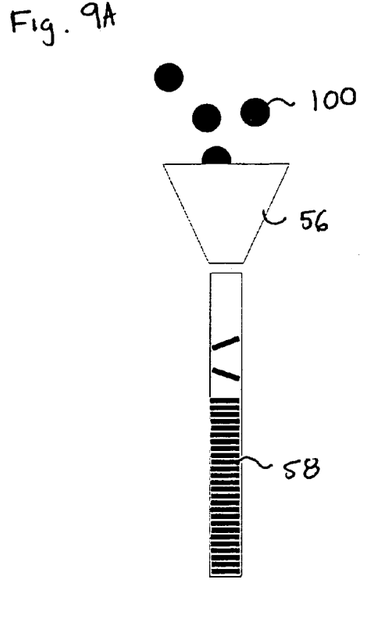
FIGS. 9A and 9B are perspective views of one embodiment of the RFID inserting device of FIG. 1.
Figure 9B:
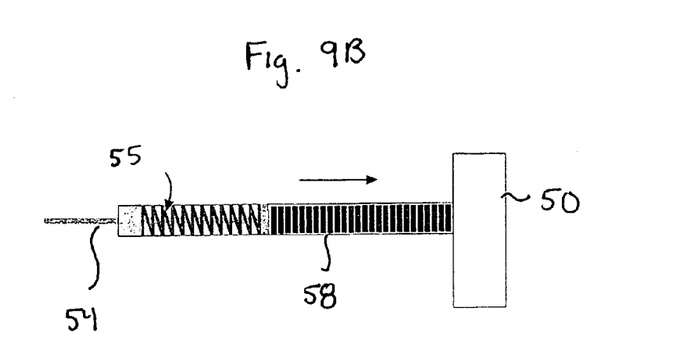

According to the embodiment of RFID tag of FIGS. 8A and 8B, the RFID coins are stacked in succession under tension and advanced to the aligning area of the block. Pusher 54 advances one or more aligned coins into the cavity 22 of the respective label of ribbons. When pusher 54 retracts the next RFID coin advances into the aligning area. As shown in FIGS. 9A and 9B, devices 100 are loaded into a sorter 56, which aligns the devices into a column 58. Pusher unit 54 communicates with column 58 via a spring 55 to deliver the RFID devices 100 to block 50 for insertion into cavities 22.

Figure 10:
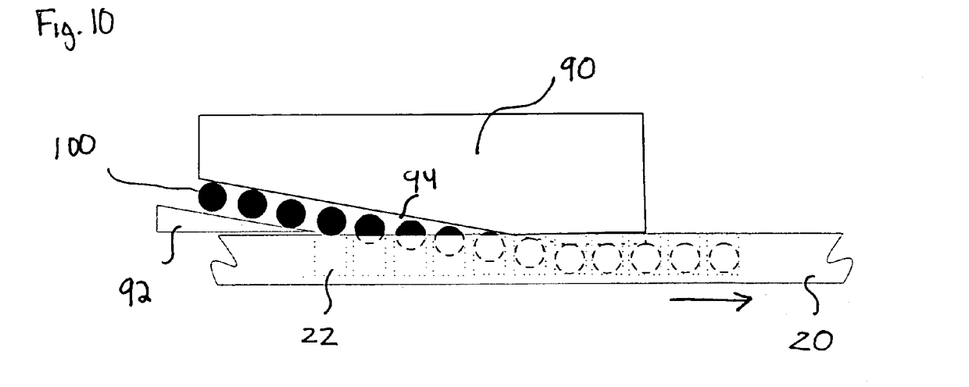
FIG. 10 is a perspective view of an alternative embodiment of an RFID inserting device according to the present invention.

Different types of aligning and inserting blocks are contemplated by the present invention and depend on the shape of the RFID device to be inserted into the cavities. For example, as shown in FIG. 10, RFID devices 100 can be inserted via a descending slope method whereby the advancing ribbon 20 drags an aligned RFID device along a sloped surface 90, 92 forcing the RFID device into the receiving cavity 22, as the overhead space 94 is reduced. Insertion occurs along the sloped guide 90. Another example of an aligning and inserting block can be a filled or continuous magazine with the RFID tags being advanced through stacking and advancing means until they reach the aligning and inserting areas.

FIGS. 1 and 2 illustrate two tags being inserted simultaneously into two separate cavities of the respective ribbons 20' and 20", one from each side of the slit down the center channel via magazines 56 and 58. In this manner, as described above, equal pressure can be maintained on each side of the ribbon support under the upper slit channel of the ribbon of labels. It should be appreciated that a multitude of pushers and blocks can be used to simultaneously insert multiple RFID devices on each side of the ribbon of labels. An indexing motor disposed between block 50 and rewind unit 12 in communication with eye 18 is contemplated by the present invention.

Figure 6A:
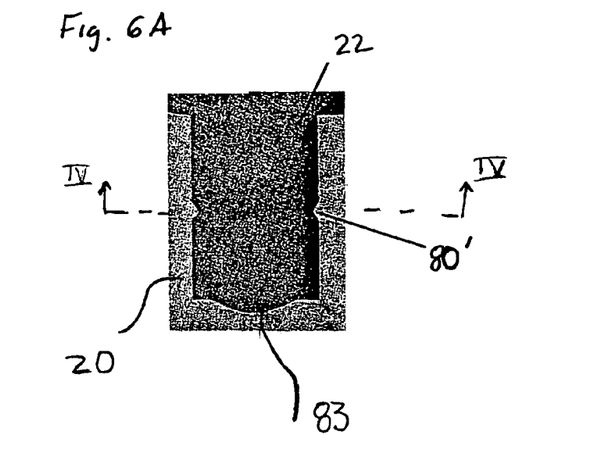
FIG. 6A illustrates a label having a woven cavity.
Figure 6B:
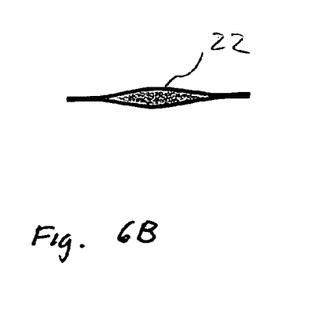
FIG. 6B is a cross-section of the label of FIG. 6A taken along line IV-IV.
Figure 7:
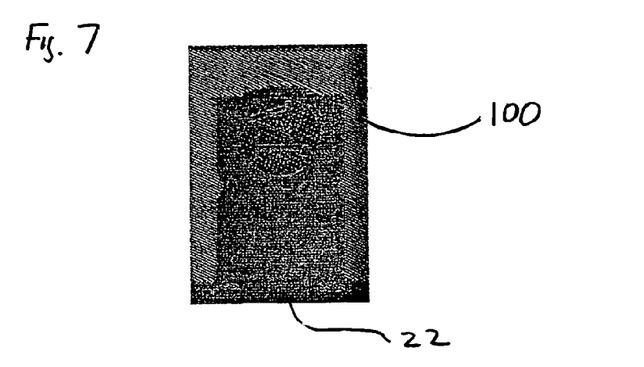
FIG. 7 illustrates a label having an RFID tag located within the cavity of the label.

Referring to FIGS. 6A-7, cavity 22 of the ribbon can be fashioned by weaving the cavity into a woven ribbon using a warp and weft yarn by known means. Alternatively, the cavities can be formed by welding or gluing two layers of ribbon, woven, film or other material, together forming open cavities to receive the RFID tags.

Referring once again to FIGS. 1 and 2, after the RFID devices are inserted into the cavities of the ribbon of labels, the ribbon travels to an unfolding station where the ribbon of labels is unfolded from the inverted "U" shape. Unfolding station can be a roller that unfolds the ribbon and controls the tension of the ribbon. Alternatively, the ribbon of labels need not be unfolded, but instead an additional motor can be provided to roll the folded ribbon of labels.

Figure 5A:
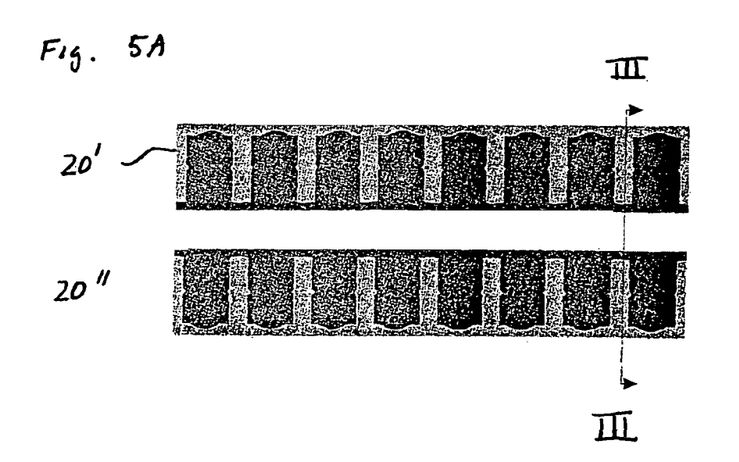
FIG. 5A is a top view of the ribbon of labels having slit upper and lower layers.
Figure 5B:
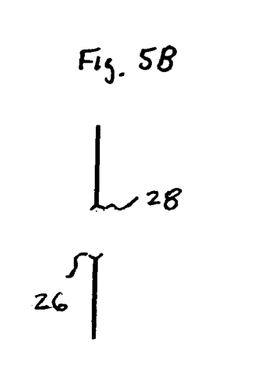
FIG. 5B is a cross-sectional view of the ribbon of labels of FIG. 5A taken along line III-III.

After the ribbon is unfolded, it passes to a second slitting station 70. At slitting station 7, the lower layer 28 of the ribbon is slit as shown in FIGS. 5A and 5B. The ribbons 20' and 20" are separated. It should be appreciated that ribbons 20' and 20" can be separated at cutting station 70, even if RFID devices were not inserted at block 50.

Thereafter, the two separate ribbons 20' and 20" can be rewound for handling or indexed and cut into individual labels as shown in FIGS. 6A and 7. A cutting station, not shown, can be incorporated in the apparatus to cut the ribbon perpendicular to the open top edges of the ribbon and seal the side edges of the labels. An ultrasonic system or other known cutting techniques can be utilized to subdivide the ribbon into individual labels. Such techniques include, for example, cold or hot shearing knives, hot fuse knives that squeeze off the product during cutting, extreme high mechanical pressure, high-pressure air, high-pressure water, laser cutting, rotary die cutters, and others. In the case of using a cutting station to cut individual labels from the ribbon, a rewinding roller may not be necessary. The resulting labels can then be sewn into a garment or linen product.

Referring to FIGS. 6A, 7, 11 and 12, cavity 22 is designed to receive an RFID device. As previously described, although the RFID tag is illustrated as a coin and cavity 22 is shown as being formed to receive the coin-shaped RFID, other RFID device shapes or sizes and cavity shapes and sizes are contemplated by the present invention. The cavity is constructed so as to form an area of interference 80 that the RFID coin 100 must be pushed past with a certain level of force. The force applied by pusher 54 seats the RFID tag past the area of interference 80.

Figure 11:
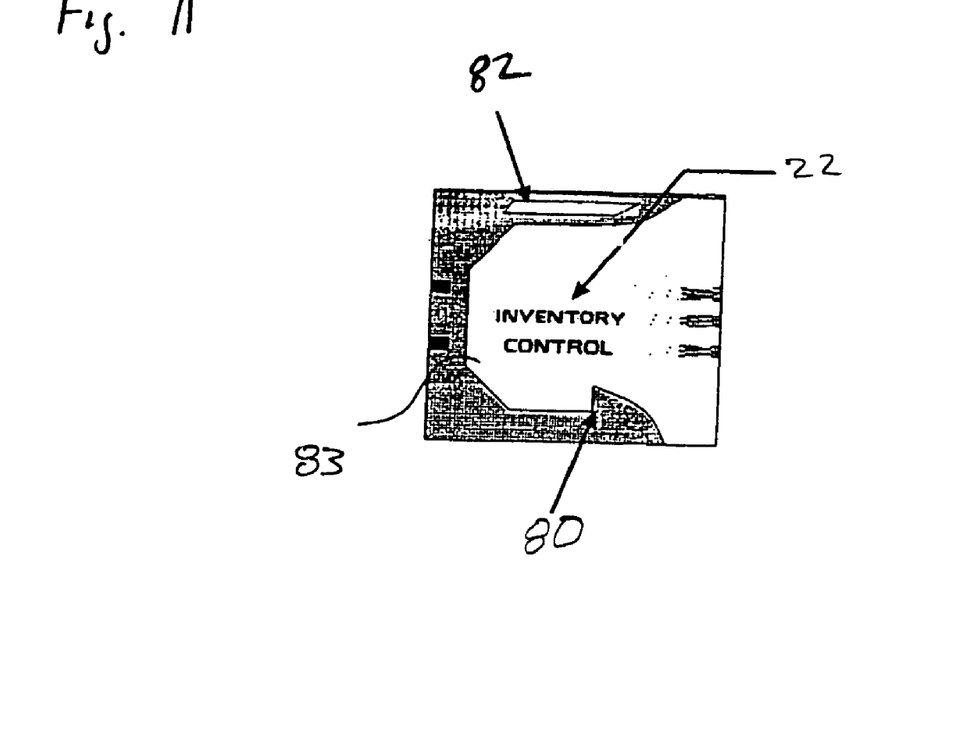
FIG. 11 illustrates a label of the present invention having an area of interference to hold the RFID device within the cavity of the label.
Figure 12:
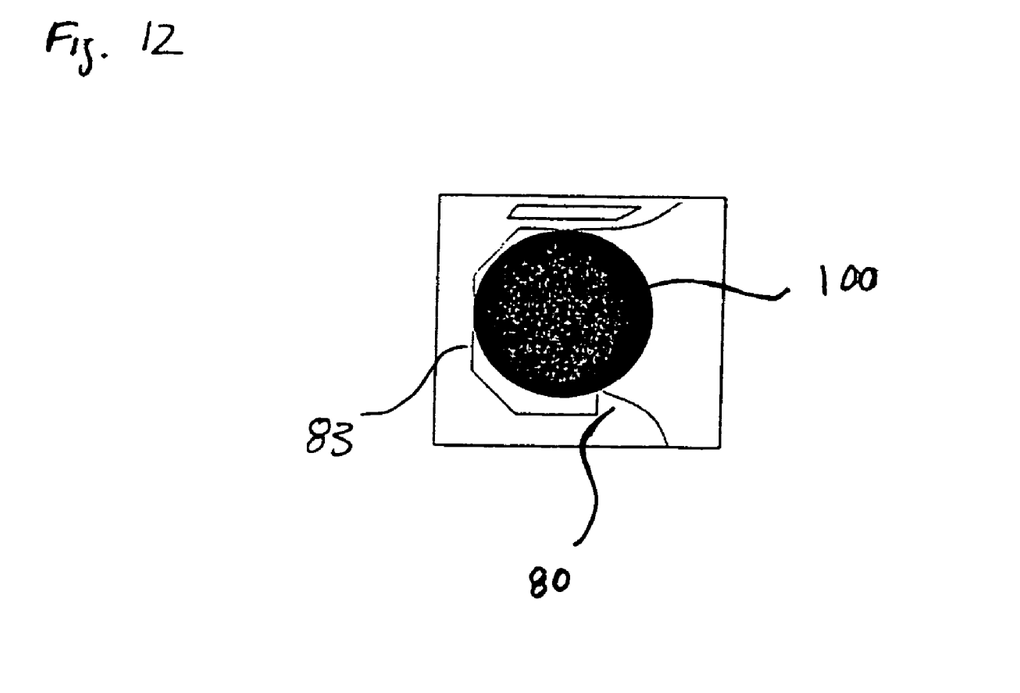
FIG. 12 illustrates the RFID tag being held within the cavity by the area of interference.

Area of interference 80 suitably holds the RFID coin in place in seat 83 of cavity 22. In other words, RFID device 100 is not permanently attached to the label, but only held under tension within cavity 22. If desired the RFID coin can be removed from the cavity by applying force against the area of interference. For example, pinching the two corners of the closed end of the label will push the coin past interference 80. Thus, the finished label of the present invention allows for the recycling of the RFID tags, whereby the RFID tags may have a longer sustainable life than the garment to which it is attached. After removal, the RFID tag can be placed into other products or garments or inserted into another woven printed label to be reattached to a garment.

As shown in FIG. 6A, the woven, welded or glued ribbon receiving cavity can be formed to have points of resistance 80 which secure the RFID tag in the cavity snugly. Receiving cavity 22 can also have a point of retraction 82 whereby pressure on the label at that respective side of the point relaxes the side of the cavity to allow the RFID tag to be inserted or removed.

The area of interference 80 and retraction break 82 can be arrived at by way of several different weaving techniques and of multiple sizes and configurations. For example, area of interferences 80' (FIG. 6A) can be woven into or cut into the upper and lower layers of the ribbon of labels.

The open side of the resulting ribbon can be welded or glued shut after the insertion of the RFID tag should the product require such.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. An apparatus for inserting a radio frequency device into a label comprising:
    a ribbon of labels having a plurality of labels and a cavity formed in each of the labels, each cavity having an interference point located therein;
    a mechanism for linear advance of the ribbon of labels; and
    a device for inserting at least one radio frequency device into the cavity of a label past the interference point to removably secure the radio frequency device within the cavity,
    wherein the ribbon of labels includes a the plurality of labels having a woven cavity disposed on both sides of a channel, and further comprising a first slitting device for slitting an upper layer of the ribbon of labels along the channel to form an opening along a top of each of the cavities.

2. The apparatus of claim 1, wherein the ribbon of labels is a woven ribbon of labels containing a logo or text.

3. The apparatus of claim 1, wherein the radio frequency device is an RFID tag.

4. The apparatus of claim 1, wherein the radio frequency device is an RFID coin.

5. The apparatus of claim 1, further comprising a folding station for folding the ribbon of labels to expose the openings of the cavities.

6. The apparatus of claim 5, wherein the device for inserting at least one radio frequency device comprises an aligning and insertion block containing a plurality of RFID devices.

7. The apparatus of claim 6, wherein the aligning and insertion block includes a pair of magazines disposed on either side of the path of the ribbon of labels.

8. The apparatus of claim 7, further comprising an advancement device in communication with each of said magazines to position at least one RFID device in one or more of said cavities.

9. The apparatus of claim 6, further comprising an unfolding device for unfolding the ribbon of labels.

10. The apparatus of claim 9, further comprising a second slitting device for cutting the length of ribbon of labels along a lower layer to form at least two separate lengths of labels, each of the lengths of labels having a plurality of cavities.

11. The apparatus of claim 1, further comprising a sensor in communication with the linear advance mechanism for controlling the advance of the ribbon of labels.

12. A label for removably securing a radio frequency device, the label comprising:
    an upper and lower layer of woven material;
    a woven cavity formed between said upper and lower layers; and
    an interference point located at a top of the woven cavity to removably secure the radio frequency device within the cavity.

13. The label of claim 12, further comprising a retraction point in communication with said interference point, whereby pressure at said retraction point will allow the radio frequency device to be pushed past said interference point to insert or remove the radio frequency device from the cavity.

14. The label of claim 12, wherein the upper and lower layers of material are welded together along a bottom edges and sides.

15. The label of claim 12, wherein the radio frequency device is an RFID tag.

16. The label of claim 12, wherein the radio frequency device is an RFID coin.

17. A method for forming a plurality of labels incorporating a radio frequency device comprising the steps of:
    providing a ribbon of labels, the ribbon of labels including a plurality of labels having a woven cavity disposed on both sides of a channel;
    slitting an upper layer of the ribbon of labels along the channel to form an opening along a top of each of the cavities, each cavity having an interference point located therein; and
    inserting at least one radio frequency device into at least one of the plurality of cavities past the interference point to removably secure the device within the at least one cavity.

18. The method of claim 17 further comprising the step of folding the ribbon of labels to expose the openings of the cavities prior to inserting the radio frequency devices into the cavities.

19. The method of claim 18, wherein the step of inserting the at least one radio frequency device comprises providing an aligning and insertion block containing a plurality of RFID devices.

20. The method of claim 19, wherein the aligning and insertion block includes a pair of magazines disposed on either side of the path of the ribbon of labels and the step of inserting the RFID devices includes simultaneously inserting at least one RFID device into the cavities disposed on both sides of the channel.

21. The method of claim 20, further comprising the step of slitting a bottom layer of the ribbon of labels to separate the ribbon of labels along the channel.

* * * * *